(No Model.)
B. C. COOK.
VEHICLE SPRING.
No. 425,755. Patented Apr. 15, 1890.
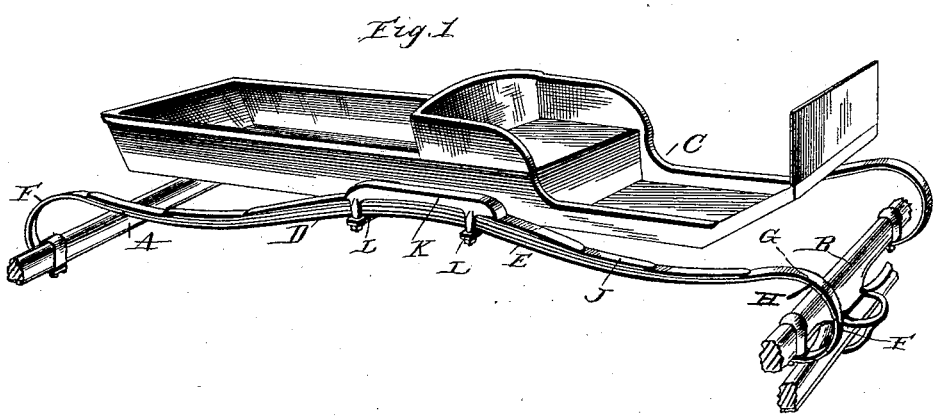
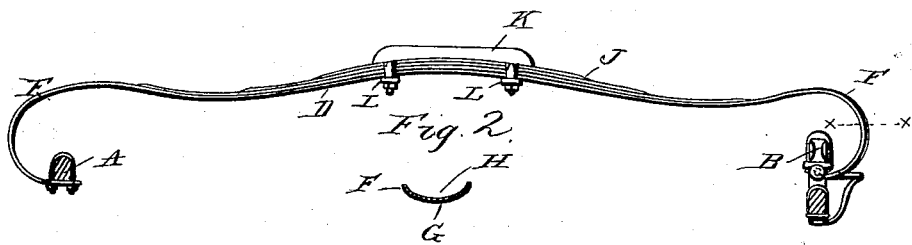
Witnesses
Wm A Robertson
K P Robertson
Inventor
Ben. C. Cook
By his Attorneys
John G. Manahan

UNITED STATES PATENT OFFICE.

BEN C. COOK, OF STERLING, ASSIGNOR TO THE EUREKA COMPANY, OF ROCK FALLS, ILLINOIS.

VEHICLE-SPRING.

SPECIFICATION forming part of Letters Patent No. 425,755, dated April 15, 1890.

Application filed October 21, 1889. Serial No. 327,680. (No model.)

*To all whom it may concern:*

Be it known that I, BEN C. COOK, a citizen of the United States, residing at Sterling, in the county of Whiteside and State of Illinois, have invented certain new and useful Improvements in Vehicle-Springs; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has reference to improvements in vehicle-springs; and it consists, more essentially, in the novel construction and location of the side spring, hereinafter described.

As the invention pertains especially to the character and location of the spring and is applicable to different kinds of vehicles, I do not deem it necessary to show or describe particularly the residue of the vehicle any further than is essential to an intelligible description of the location and operation of my invention.

In the drawings, Figure 1 is a partial side elevation exhibiting the general contour and mode of attachment of my invention. Fig. 2 is a detail of the spring proper, showing the end curves thereof and the concaved inner surface in the bowed portions of the same.

A represents the rear axle of the vehicle, and B the transverse head-block, which is imposed upon the fifth-wheel and carried upon the front axle.

C is the body of the vehicle, which may be of any desired character or shape.

D is the spring proper, one pair of which is used with each vehicle. The springs D are respectively placed at each side of the body C, parallel therewith, and attached, as hereinafter described, at their respective ends to the rear axle A and head-block B. The spring D is constituted of the lower extended limb E, which is given an upward curvature at its center, and is provided at each end with the half-circle bows F. The bows F are turned downward from the main portion of the spring D, and are fastened at their respective extremities to the lower surface of the rear axle A and head-block B by suitable clips or bolts. The bowed ends of the spring D extend, respectively, in front of the head-block B and behind the rear axle A. The spring D at and throughout the main portion of the bow F is bent into trough shape, as shown in the section detail in Fig. 2—that is, each bow is formed with the convexity G in cross-section on its outer surface and the corresponding concavity H upon its inner surface. This conformation is intended to and does have the effect of affording additional strength to that portion of the bow F, which said portion is largely relied upon to furnish additional elasticity to said spring. The spring D is supplied centrally with any desired number of additional leaves J, shaped to conform to the central curvature of said spring and attached thereon in any suitable manner. A block K is placed longitudinally on the center of the spring D, and attached thereto at two points, as shown, by suitable clips. Two cross-bars L, attached at their inner ends to the base of the body C, extend outwardly, and are attached to the lower surface of the spring D, respectively, at two points of attachment thereto of the block K. This attachment places the weight to be borne by said spring at two points thereon, and thereby the better distributes said weight.

One advantage of my invention is that it renders feasible the use of a long spring within a comparatively limited space.

Another advantage thereof consists in the fact that in the vertical movements of the spring the tendency is to move the bowed portions F forward and back, thereby locating the resiliency at and within said bows. By the concavo-convex conformation of said bows the latter are afforded the additional strength required in them by reason of their peculiar location and operation. By turning said bows downward the impulse of the weight is toward the center of the curvatures of the bows F, a direction in which said bows are best qualified to resist the strain thereon.

What I claim as my invention, and desire to secure by Letters Patent of the United States, is—

1. A vehicle-spring D, the lower extended limb of which has an upward curvature at its center, and at each end having a half-circle bow F, formed with a convexity G in cross-section on its outer surface and a corresponding concavity H on its inner surface.

2. The combination of the axle A, head-block B, body C, with the spring D, having bows F at each end bent in trough shape, as and for the purposes set forth.

In testimony whereof I affix my signature in presence of two witnesses.

BEN C. COOK.

Witnesses:
JOHN G. MANAHAN,
ADDA E. WARD.